(12) United States Patent
Butler

(10) Patent No.: US 7,136,062 B1
(45) Date of Patent: Nov. 14, 2006

(54) SCALABLE MULTIPARTY CONFERENCING AND COLLABORATION SYSTEM AND METHOD OF DYNAMICALLY ALLOCATING SYSTEM RESOURCES AND PROVIDING TRUE COLOR SUPPORT IN SAME

(75) Inventor: Laura J. Butler, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/395,480

(22) Filed: Sep. 14, 1999

(51) Int. Cl.
*G06T 15/40* (2006.01)

(52) U.S. Cl. .................... 345/422; 345/597; 345/591; 345/600; 345/605

(58) Field of Classification Search ................ 345/422, 345/597, 591, 600, 605
See application file for complete search history.

(56) References Cited

U.S. PATENT DOCUMENTS

| | | | |
|---|---|---|---|
| 5,060,054 A * | 10/1991 | Murakami et al. .......... | 348/701 |
| 5,467,264 A | 11/1995 | Rauch et al. | |
| 5,471,318 A | 11/1995 | Ahuja et al. | |
| 5,530,795 A | 6/1996 | Wan | |
| 5,717,863 A | 2/1998 | Adamson et al. | |
| 5,717,879 A | 2/1998 | Moran et al. | |
| 5,812,534 A | 9/1998 | Davis et al. | |
| 5,864,711 A | 1/1999 | Mairs et al. | |
| 5,870,547 A | 2/1999 | Pommier et al. | |
| 5,874,960 A | 2/1999 | Mairs et al. | |
| 6,288,729 B1 | 9/2001 | Laksono et al. | |
| 6,292,166 B1 * | 9/2001 | Palmer et al. .............. | 345/589 |

FOREIGN PATENT DOCUMENTS

DE         38 18 087        12/1989

OTHER PUBLICATIONS

Kanellopoulos, D.N. et al. "The Comprehensive Approach of QoS and the Evolution of ACSE Protocols in Multimedia Communications" *Electronics, Circuits and Systems*, 1996, 'ONLINE! vol. 1, Oct. 13-16, 1996, pp. 323-326.

Onmori T et al. "Cooperative Control for Sharing Applications Based on Distributed Multiparty Desktop Conferencing System: Mermaid" *Proceedings of the International Conference on Communications, US, NewYork, IEEE*, vol.-, Jun. 14, 1992, pp. 1069-1075.

(Continued)

*Primary Examiner*—Kee M. Tung
*Assistant Examiner*—Tam Tran
(74) *Attorney, Agent, or Firm*—Perkins Coie LLP

(57) ABSTRACT

A networking conferencing and collaboration tool utilizing an enhanced T.128 application sharing protocol. This enhanced protocol is based on a per-host model command, control, and communication structure. This per-host model reduces network traffic, allows greater scalability through dynamic system resource allocation, allows a single host to establish and maintain a share session with no other members present, and supports true color graphics. The per-host model allows private communication between the host and a remote with periodic broadcasts of updates by the host to the entire share group. This per-host model also allows the host to allow, revoke, pause, and invite control of the shared applications. Subsequent passing of control is provided, also with the hosts acceptance. The model contains no fixed limit on the number of participants, and dynamically allocates resources when needed to share or control a shared application. These resources are then freed when no longer needed. Calculation of minimum capabilities is conducted by the host as the membership of the share changes. The host then transmits these requirements to the share group.

20 Claims, 2 Drawing Sheets

OTHER PUBLICATIONS

"Microsoft NetMeeting 3.0 Resource Kit," Microsoft Corporation, 1999.

R. Schaphorst, "Chapter 7: ITU-T Recommendation H.323 Packet-Based Multimedia Communications Systems," *Videoconferencing and Videotelephony: Technology and Standards,* Boston, Massachusetts, 1999.

"TAPI 3.0 and NetMeeting 2.0," *Microsoft Developer's Network CD,* Microsoft Corporation, Mar. 30, 1999.

R. Schaphorst, "Chapter 10: Multipoint Graphic Communications (T.120)," *Videoconferencing and Videotelephony: Technology and Standards,* Boston, Massachusetts, 1999.

"Understanding Proxy Server," *Microsoft Developer's Network CD,* Microsoft Corporation, 1998.

"Video-Conference Program Allows More Private Face-To-Face Time," Chicago Tribune, May 24, 1999.

"Exchanging Session Keys," *Microsoft Developer's Network CD,* Microsoft Corporation, 1999.

"Chapter 4 Firewall Configuration," *Microsoft Developer's Network CD,* Microsoft Corporation, Apr. 30, 1998.

"Chapter 6 Troubleshooting," *Microsoft Developer's Network CD,* Microsoft Corporation, Apr. 30, 1998.

"Chapter 7 NetMeeting Architecture," *Microsoft Developer's Network CD,* Microsoft Corporation, Apr. 30, 1998.

"Chapter 8 Conferencing Standards," *Microsoft Developer's Network CD,* Microsoft Corporation, Apr. 30, 1998.

"Chapter 9 Product Interoperability," *Microsoft Developer's Network CD,* Microsoft Corporation, Apr. 30, 1998.

A. Krassel et al., "Microsoft's NetMeeting 2.1 COM Interfaces: Understanding How They Work," Microsoft Corporation, [web page], Apr. 10, 1998. http://www.msdn.microsoft.com/workshop/messaging/netmtg/netmtgcom.asp. [Accessed May 18,1999].

"Text Figures," Microsoft Corporation, [web page], 1999. http://www.microsoft.com/mind/0199/netmeeting/netmeetingtextfigs.htm. [Accessed May 18, 1999].

Microsoft Corporation, "How to Establish NetMeeting Connections Through a Firewall," [web page], revised Oct. 23, 1998. http://support.microsoft.com/support/kb/ARTICLES/Q158/6/23.asp. [Accessed May 18, 1999].

Microsoft Corporation, "How to Create a NetMeeting Hyperlink on a Web Page," [web page], revised Oct. 22, 1998. http://support.microsoft.com/support/kb/ARTICLES/Q157/2/77.asp. [Accessed May 18, 1999].

Microsoft Corporation, "How to Share Programs with NetMeeting," [web page], revised Oct. 27,1998. http://support.microsoft.com/support/kb/ARTICLES/Q154/3/54.asp. [Accessed May 18, 1999].

Microsoft Corporation, "How to Make a Video Call with NetMeeting," [web page], revised Oct. 27, 1998. http://support.microsoft.com/support/kb/ARTICLES/Q167/7/78.asp. [Accessed May 18, 1999].

Microsoft Corporation, "How to Start NetMeeting Conference from a Command Line," [web page], revised Oct. 27, 1998. http://support.microsoft.com/support/kb/ARTICLES/Q167/0/97.asp. [Accessed May 18, 1999].

Microsoft Corporation, "How to Use Whiteboard in Microsoft NetMeeting," [web page], revised Oct. 27, 1998. http://support.microsoft.com/support/kb/ARTICLES/Q154/3/10.asp. [Accessed May 18, 1999].

White Pine, "CU-SeeMe Pro Will Improve Communication and Collaboration," [web page], 1999. http://www.wpine.com/Products/CU-SeeMe-Pro/cu-pro-business-features.html. [Accessed May 19, 1999].

White Pine, "All New CU-SeeMe Pro-Changing the Face of Communication!," [web page], 1999. http://www.wpine.com/Products/CU-SeeMe-Pro/index.html. [Accessed May 19, 1999].

DataBeam, "DataBeam Meeting Tools!," [web page], 1999. http://www.databeam.com/meetingtools/info.html. [Accessed May 19, 1999].

IMTC, "IMTC Search: H.245," [web page], 1999. http://www.imtc.org/cgi-bin/query.cgi. [Accessed May 11, 1999].

IMTC, "H.323 Overview," [web page], 1999. http://www.imtc.org/h323body.htm. [Accessed May 11, 1999].

IMTC, "Frequently Asked Questions," [web page], 1999. http://www.imtc.org/faqbody.htm. [Accessed May 11, 1999].

IMTC, "H.320 Overview," [web page], 1999. http://www.imtc.org/h320body.htm. [Accessed May 11, 1999].

IMTC, "T.120 Overview," [web page], 1999. http://www.imtc.org/t120body.htm. [Accessed Jun. 17, 1999].

"NetMeeting 3 Beta," [web page], Updated Mar. 23, 1998. http://www.microsoft.com/netmeeting/Beta30.htm. [Accessed May 7, 1999].

A. Krassel et al., "Microsoft NetMeeting 2.1 COM Interfaces: Understanding How They Work," [web page], Microsoft Corporation, Apr. 10, 1998. http://msdn.microsoft.com/library/techart/msdn_netmtgcom.htm. [Accessed May 4, 1999].

Don Anderson, "Overview of the IEEE 1394 Architecture,"*FireWire System Architecture: 2nd Edition,* MindShare, Inc., Addison-Wesley: Reading, Massachusetts, pp. 19-34, (1999).

"Secure Networking Using Microsoft Windows NT 5.0 Distributed Security Services," *Microsoft Developer's Network CD,* Microsoft Corporation, 1999.

Microsoft Corporation, "Microsoft Certificate Server," [web page], Apr. 17, 1997. http://msdn.microsoft.com/workshop/security/client/certsvr.asp. [Accessed May 20, 1999].

Microsoft Corporation, "Windows NT E3/F-C2 Evaluations," [web page], Apr. 28, 1999. http://www.microsoft.com/security/issues/e3fc2summary.asp. [Accessed May 4, 2000].

Microsoft Corporation, "Secure Sockets Layer/Transport Layer Security," [web page], Oct. 8, 1998. http://www.microsoft.com/security/tech/ssl/default.asp. [Accessed May 21, 1999].

Microsoft Corporation, "How to Parse a Certificate Using Active Server Pages (ASP)," [web page], Updated Dec. 1996. http://msdn.microsoft.com/workshop/security/client/parse.asp. [Accessed May 20, 1999].

Microsoft Corporation, "Securing Data Transmissions with Secure Sockets Layer (SSL)," [web page ], Updated Dec. 1996. http://msdn.microsoft.com/workshop/security/client/iis_ssl.asp. [Accessed May 20, 1999].

Netscape Communications Corporation, "How SSL Works," [web page], 1999. http://developer.netscape.com/tech/security/ssl/howitworks.html. [Accessed Nov. 16, 1999].

VeriSign, Inc., "Encryption and Digital Certificates," [web page], 1999. http://www.verisign.com/whitepaper/enterprise/overview/page2.html. [Accessed Nov. 16, 1999].

Netscape, "How Digital Certificates Work," [web page], 1999. http://www.netscape.com/security/techbriefs/certificates/howcerts.html. [Accessed Nov. 16, 1999].

Netscape Communications Corporation, "Enterprise-Ready, Open Standards-Based Email Security," [web page], 1999. http://developer.netscape.com/tech/security/email/smime.html. [Accessed Nov. 16. 1999].

Netscape, "How Personal Certificates Work," [web page], 1999. http://www.netscape.com/security/techbriefs/personalcerts/how.html. [Accessed Nov. 16, 1999].

Netscape, "Personal Certificates," [web page], 1999. http://www.netscape.com/security/techbriefs/personalcerts/index.html. [Accessed Nov. 16, 1999].

Keith Brown, "Security Briefs," *Microsoft Developer's Network CD,* Microsoft Corporation, Feb. 1999.

"PFX: Personal Information Exchange Syntax and Protocol Standard," *Microsoft Developer's Network CD,* Microsoft Corporation, Jan. 27, 1997.

J. Benaloh et al., "The Private Communication Technology (PCT) Protocol," *Microsoft Developer's Network CD,* Internet Draft, Microsoft Corporation, Oct. 1995.

"What's New in the NetMeeting Resource Kit Wizard," *Microsoft Developer's Network CD: Microsoft NetMeeting,* Microsoft Corporation, Apr. 1999.

"First-Time Users," *Microsoft Developer's Network CD: Microsoft NetMeeting,* Microsoft Corporation, Apr. 1999.

"Before the Meeting Starts," *Microsoft Developer's Network CD: Microsoft NetMeeting*, Microsoft Corporation Apr. 1999.

"During the Meeting," *Microsoft Developer's Network CD: Microsoft NetMeeting*, Microsoft Corporation, Apr. 1999.

"Troubleshooting Tips," *Microsoft Developer's Network CD: Microsoft NetMeeting*, Microsoft Corporation, Apr. 1999.

"Glossary," *Microsoft Developer's Network CD: Microsoft NetMeeting*, Microsoft Corporation, Apr. 1999.

"NetMeeting 2.1 Features," [web page], Microsoft Corporation, Update Jan. 5, 1998. http://www.microsoft.com/netmeeting/features/main.html. [Accessed May 4, 1999].

Microsoft Corporation, "Microsoft NetMeeting 2.0: Overview and Frequently Asked Questions," [web page], Updated Jul. 15, 1997. http://msdn.microsoft.com/library/backgrnd/html/msdn$_{13}$netmofaq.htm. [Accessed May 4, 1999].

"Microsoft NetMeeting 3.0 Resource Kit," Microsoft Corporation, 1999.

DataBeam, "A Primer on the T.120 Series Standard," [web page], 1999. http://www.databeam.com/ccts/t120primer..html. [Accessed May 4, 1999].

* cited by examiner

SCALABLE MULTIPARTY CONFERENCING AND COLLABORATION SYSTEM AND METHOD OF DYNAMICALLY ALLOCATING SYSTEM RESOURCES AND PROVIDING TRUE COLOR SUPPORT IN SAME

FIELD OF THE INVENTION

The instant invention relates to Internet and intranet multiparty conferencing and collaboration tools, and more particularly to a multiparty conferencing and collaboration tool providing enhanced scalability through the dynamic allocation of system resources which also provides true color 24 bpp support.

BACKGROUND OF THE INVENTION

Real time communication is vital to the success of any business. As businesses continue to grow and develop outside the typical four walls of an office or factory, with multiple divisions located around the country and around the world, with an increasing number of employees telecommuting, and even with employees located in different distant parts of the same building, tools facilitating real time communication are becoming essential, not just for businesses to succeed, but also for businesses to simply survive. While the widespread use of local area networks (LANs), wide area networks (WANs), and e-mail has increased the productivity of many companies and individuals, such structures and tools do not provide, by themselves, the ability for real time group collaboration so essential for the success of work groups and design teams which, in turn, drives the success of businesses.

In recognition of the changing way businesses need to function to survive and prosper in this distributed environment of the world-wide workplace, the assignee of the instant invention developed and released a network conferencing and collaboration tool called NetMeeting™ 2.0. This tool provides H.323 standards-based voice and video conferencing, T.120 multipoint data conferencing including application sharing, clipboard sharing, file transfer, whiteboard, and chat features. Application sharing is a feature of NetMeeting™ that allows a person in a conference running an application locally with local data (like Notepad™) to send the graphics of the application to the other people in the conference. The remote people see what the local person does, the title bar, the client area, obscured areas, etc. The remotes can even control the shared application, the remote person in control's keyboard and mouse drive the keyboard and mouse of the person sharing the application. This results in appearance changes, like opening a new file would, and those will be transmitted back from the sharer to the others.

These features were immediately successful in aiding the real time communication and design activity of many businesses. As companies became more and more familiar with the advantages available through such a tool, their demand for increased usage of and capabilities from such a tool exceeded even the expectations of the assignee. However, at the same time that users were demanding increased usage, they were also demanding increased control, new features, and reduced network resource and time utilization from this tool.

One of the most desired feature enhancements of this tool was to increase the number of simultaneous users who could participate in an on-line conference. However, a 16-bit version of the application sharing code, NetMeeting™ 2.0, was built on the Win 9x platform which is interrupt based for mouse and keyboard inputs. As such, and because it was based off Win3.x technology, this platform required the up-front allocation of system memory for all users. This up-front allocation of system resources required that all resources which might ever be need by the users were allocated. This was quite wasteful since a good portion of the allocated resources needed for application sharing were allocated to many users who would never share or collaborate, and were only in the meeting to view. This could total three megabytes for each user, to represent their desktop and create the required object caches. Because of this memory allocation requirement and based on estimated typical system user resources, a maximum hard limit of 32 users was set in the system. While this was believed to be adequate for most meetings, the demand for more attendees based on the ease of communication flow soon pushed the limit beyond that which the system would allow.

Another problem which became apparent as the number of meeting participants grew relates to the network traffic generated between participants under the T.128 application sharing protocol. With increasing numbers of participants in a meeting, the number of message packets sent between these participants during operation and when a new person wanted to join the meeting increased to a point where the delay in communication and interruption of the meeting became excessive. In addition to the number of messages which were sent, the computational algorithms used were complex, adding proportionally to the amount of time needed for anything to happen. Depending on the particular connections between participants, e.g. the Internet, the delay in the meeting resulting from a new person joining could extend into the several minutes range. With this type of delay, people hang-up, lose their Internet connection, lose interest, etc.

The T.128 model utilized in this NetMeeting™ system was a global free-for-all model where all members were peers. Every person in the conference would maintain a global list, ordered from front to back of all of the shared applications of everybody in the conference, merged completely together. Each person had to be in lock-step with the others, so that the positions, order, and appearance of all shared applications were in sync. Any change in order, state, or position had to be transmitted to everyone in the meeting. This would frequently cause a Ping-Pong effect whereby the new global list would be sent, someone in the conference would decide it was out of date because their shared application had moved, and would transmit a new window list, and so forth. This problem was exacerbated by the collaboration model which also required that all members of the conference periodically broadcast his or her mouse position. This additional network traffic was necessitated by the toggle during collaboration whereby only one of the collaborators controlled all of the collaborators' mice and keyboards. Therefore, the host would periodically need to check where everyone's cursor is positioned.

As a result of this global, chaotic model, the total network traffic could become excessive due to the amount of this circular traffic, even from members not sharing anything. All of the packets of information were broadcast, with one copy for each member of the conference. The delays resulting from this excessive network traffic caused cursor movements, especially when in control of a remote member's application, to be extremely jerky. This made it almost impossible to control a remote's application with any degree of confidence that the remote user's mouse was really where the controlling member thought it was. Further, under this model no one could do anything until all members were up to date, which further slowed the conference response time. In addition to the network traffic described above, to interpret data from a host, e.g. the drawings of an application, all members in the conference had to know about and interpret the capabilities of all other members of the conference. This drove the network traffic volume even higher, and slowed the system response still further.

Another problem which became apparent from the global collaboration model of NetMeeting™ 2.0 as the number of members in a conference grew was the control of applications which were being shared. This control/collaboration model in the T.128 application sharing protocol of NetMeeting™ 2.0 was global. Each member of the conference could start/stop collaborating. Exactly one of the members collaborating was considered to be in control. Her mouse/keyboard drove the mice and keyboards of the other members collaborating. Those other members were controlled, and their mice and keyboards were locked. However, if they were not sharing anything, the mouse and keyboard input from the person in control would go to nowhere, since the remote users were only allowed to control shared applications, and not unshared ones. This appeared to lock their mice and keyboards for no reason, which was very frustrating especially in the multitasking world of Windows™.

Additionally, anyone collaborating could become the person in control by a simple action such as a mouse click or key press. If several people took control around the same time, the last person to do so won, until the next person took control. There was no organization or order to the passing of control, it was a chaotic model. The users of the system soon termed this chaotic operation as "mouse wars." With a decent number of people in a conference, the telephone was the only way to keep things from getting out of hand. There was a lot of "OK, I am going to take control now, do not do anything anybody" discussion back and forth. Further, collaboration was a two-way street. A person might only want to control another's applications without exposing his own applications to another's control. Unfortunately, that was not possible in this model. Collaboration was all or nothing. Additionally, there was no way for a person to gracefully decline a control operation or even know that it was about to happen. Control would be yanked away without warning.

This global, chaotic collaboration model also added to the excessive network traffic described above. Each control change required some retransmitting of input state information, especially toggle keys, and discarding old accumulated input. The person in control broadcasted his input messages to everyone. All of the members collaborating played back these input messages, skipping ones that obviously would manipulate non-shared windows, and then if they ended up going to a window not shared, swallowed them at the last minute. That allowed the cursor to move, but the actual movement of the mouse notification to not get sent to the windows under the mouse if they are not shared. Further, there was required a lot of complicated token/sequence number/guessing/time stamp calculations performed to figure out who has control if several people try to take control at once, or if it is taking too long to hear back.

A further problem identified relates to the initiation of an application share for a conference. The T.128 protocol utilized in NetMeeting™ 2.0 requires two people to be in a conference before anybody could share an application. This requirement also meant that if the second-to-last person left the conference, sharing would stop if it were ongoing. This requirement existed because starting up application sharing was a call-response process. The person wanting to share an application would broadcast an "is it ok" packet, and then wait for a response saying "sure, go ahead" before beginning the share. This turned out to be a much worse than is may have first appeared. Users wanted to be able to organize a meeting whereby they could be the only person in the meeting for a while to allow them to set up attributes, applications, and files prior to having others join the meeting. Without this capability, much time is wasted by the other meeting participants while the host completes these activities with them present.

An additional problem relates to the prior T.128 protocol for NetMeeting™ having a limit of 256 colors, 8 bits per pixel (bpp). If a user shared applications on a screen that was running at a greater color depth than 256, information would be lost. The graphics would be constrained and colors would be mapped to the closest equivalent in a 256 color palette. Simple applications did not experience much of a problem, since not many applications make full use of the available colors. The system colors and other common ones are always available. However, a high end bitmap or a web page with photos, for example, would not look good when shared. They would look posterized on the remote users' monitors.

SUMMARY OF THE INVENTION

In view of the above identified and other problems existing in the art, the inventive concepts and teachings of the instant invention involve the application sharing protocol otherwise known as T.128, as preferably implemented in NetMeeting™ 3.0. These protocol changes are the result of a shift from a global collaboration model of prior versions of NetMeeting™ to the "per-host model" of NetMeeting™ 3.0 and later versions. The implementation of the per-host model vastly increases the functionality and ease of use of network conferencing tools by reducing network traffic, allowing greater scalability, providing better control and collaboration among users, allowing solitary members to begin a share without the necessity of a second or subsequent party, and supporting true color graphics.

By implementing a per-host model whereby communication with and control of the host takes place in a private fashion between the host and a remote with periodic broadcast updates by the host to the entire share group, the total number of network messages which are required to be transmitted between the members of the share group are greatly reduced. To contrast this per-host model, the prior versions of NetMeeting utilized a global model where each person in the conference would maintain a global list, ordering front to back, of all the shared applications of everybody in the conference, merged completely together. This resulted not only in a large number of messages being initially required to maintain the members of the conference in lockstep, but also had a ripple effect whereby each adjustment resulting from the reception of such a message would essentially be echoed back in a broadcast global fashion since a change had now occurred on that user's system.

In the per-host model, the network traffic almost always originates from the host only as opposed to being globally transmitted by each of the members of the conference. While multiple members of the conference may share an application, this per-host model allows each of those members who are sharing to act like a miniature server for the conference, i.e. a host of that shared application. Updates, therefore, instead of being globally transmitted by all members of the conference, simply now stream down from the host. This requires only that the members of the conference need the capabilities of that particular host. A performance improvement is particularly noticeable in the per-host model when a member of the conference is in control of the host. In the per-host model the controlling member transmits its keyboard and mouse move messages privately to the host who then periodically broadcasts the current cursor position to all members of the conference.

Industry performance data has indicated that a reduction in network traffic of about 25% in a 5 person conference with one person sharing. This reduction increases as the number of people sharing increases, and as the number of people in the conference increases. The reduction in network traffic when someone is controlling the shared applications of another is approximately 50% or more. This reduction could be increased, however it was decided instead to increase the fidelity of the mouse moves to allow finer movements, etc. for better responsiveness. This means that many more mouse move packets are sent than prior versions to allow for this better performance. The reduction in network traffic to add a new person to the conference is approximately 90% or more when the number of existing people is 20 or greater. This reduction is truly an unexpected result which was originally met with skepticism from industry experts until confirmed with actual measurments.

At a detailed level, the following packet changes are implemented for NetMeeting™ 3.0: fewer and smaller Shared Window Lists (SWL) broadcast packets; fewer Active Window Coordinator (AWC) broadcast packets; fewer cursor broadcast packets; fewer Host Entity Tracker (HET) broadcast packets; fewer Synchronizing New Individuals (SNI) broadcast packets; fewer control arbitration (CA) packets; new control (CA30) packets; and fewer Input Manager (IM) packets. These revised and new packets, and the way that they are shared when a new member joins the conference, result in a significant reduction in traffic during application sharing just to get everyone in synchronism with the sharing application.

A further embodiment of the instant invention includes a new collaboration/control model for the application sharing protocol T.128 as implemented in the per-host model of NetMeeting™ 3.0. In the new T.128 application sharing protocol, the control/collaboration model is per-host. As such, the host is in control not only of her shared application, but also of when and to whom control is relinquished. This allows a host to share an application without worrying about inadvertently losing control of her shared application, and also allows a host to take control of another host without requiring that she give up control of her shared applications. This ability to designate a host's controllable status as well as the granting or denying of control to a member is effectuated through a simple process. Under this process a host may indicate that her applications are not controllable, in which case she has full control of her shared applications without further interaction or requirement on her part. Alternatively, the host may, at any time during the share, designate an application as being controllable, in which case control of her shared application may be passed to another member of the share. In this state the host may decide to pass control by her own initiation to another member of the share by offering control to that member. In this type of situation, the host invites a remote to assume control of the shared application at which point the remote then has the option to accept control or decline the offer. Until the remote has either accepted or declined the invitation to assume control of the shared application, the host has the power to revoke the invitation.

In addition to the host initiated invitation to assume control of the shared application, a remote may also request permission from the host to take control of her shared application. Under this condition the remote sends a request to assume control to the host who then has the option to either accept or decline the request for assumption of control. As with the invitation to assume control, the remote who has initiated the request has the power to cancel the request at any time prior to the host's acceptance or declination of granting control. Further, to ensure that requests and invitations do not go unanswered, the system also includes a time out function whereby a request or an invitation is only valid for a certain period of time after which the request or invitation is automatically declined. At any point during the remote control of the host's shared application, the host has the power to immediately terminate the remote's control. Further, the host also has the less intrusive option of simply pausing the remote's control temporarily while still maintaining that remote in actual control of the shared application. Once the host unpauses the control the remote then is able to pick up where she left off.

The control may also be passed from one remote to another in this preferred embodiment. However the per-host model ensures that the host of the shared application agree with the passing of control to a subsequent remote before actual control is passed to that remote. If the passing of control to a subsequent remote is agreeable with the host, control is passed to that subsequent remote. If the host disagrees with the subsequent passing of control to the subsequent remote, control stays with the initial remote user. As with requesting or inviting control from a host, a similar mechanism is utilized at the remote level for requesting or inviting control. However, the ultimate decision maker for the shared application control is the host who initiated the share.

In a preferred embodiment of the instant invention, the memory allocated to each member of the conference is now set dynamically such that each member is given a minimum allocation of memory which may be adjusted once that member begins to share. Further, since the memory allocation is now dynamic, the necessity for placing a maximum limit on the number of users of a conference is no longer required. Therefore, the system of the instant invention allows as many members in a conference as may be supported by the meeting or conference host's memory availability. As new members join a conference or as old members leave a conference, memory is dynamically allocated to or freed from that member without significant disruption to the overall operation of the system.

The new T.128 protocol of the instant invention also preferably allows a one person conference by not waiting for a response to the broadcast "is it okay" packet sent to establish a share. Instead, the new T.128 protocol assumes that sharing has succeeded if the person sharing is also the host of the meeting. This mechanism also resolves any conflict resolution problem by always working in favor of the meeting or conference host should two people attempt to share the first thing at about the same time. Further, the conflict resolution works in favor of the more senior conference or meeting member (the one who joined the meeting or conference earlier than the other) should the conflict not involve the meeting or conference host.

Additionally, a preferred embodiment of the instant invention utilizes the new T.128 protocol to support true color application sharing in a 24 bits per pixel, non-palettized, standard interchangeable format that maps directly to the video hardware. However, while 24 bits per pixel true color is supported, it will only be sent if everyone in the conference has the capability to view it and everybody has a 24 bpp or greater display. If not everyone has a 24 bpp or greater display, the information will not be accurately displayed on their machine and, since such true color support generates a lot more data, there is no need to send such high quality video information if it cannot be viewed accurately anyway. This additional data does not affect performance much if applications such as NotePad™ are being shared. However, if a graphically intensive application is shared there may be significant performance impact. This is because a fixed amount of memory is devoted to the cached bitmaps, and the 24 bpp bitmaps are three times the size of an 8 bpp bitmap. Therefore, only one-third as many fit in the cache. This results in fewer cache hits which then necessitates the sending of bitmap bits more often. Further, since application sharing has a maximum uncompressed packet size of 32,000 bytes, it holds less true color screen data or true color bitmap cache orders, resulting in the requirement for sending more packets for the same area painted.

These and other features of the invention will become more apparent from the following detailed description when taken in conjunction with the accompanying drawings.

Figure 1:
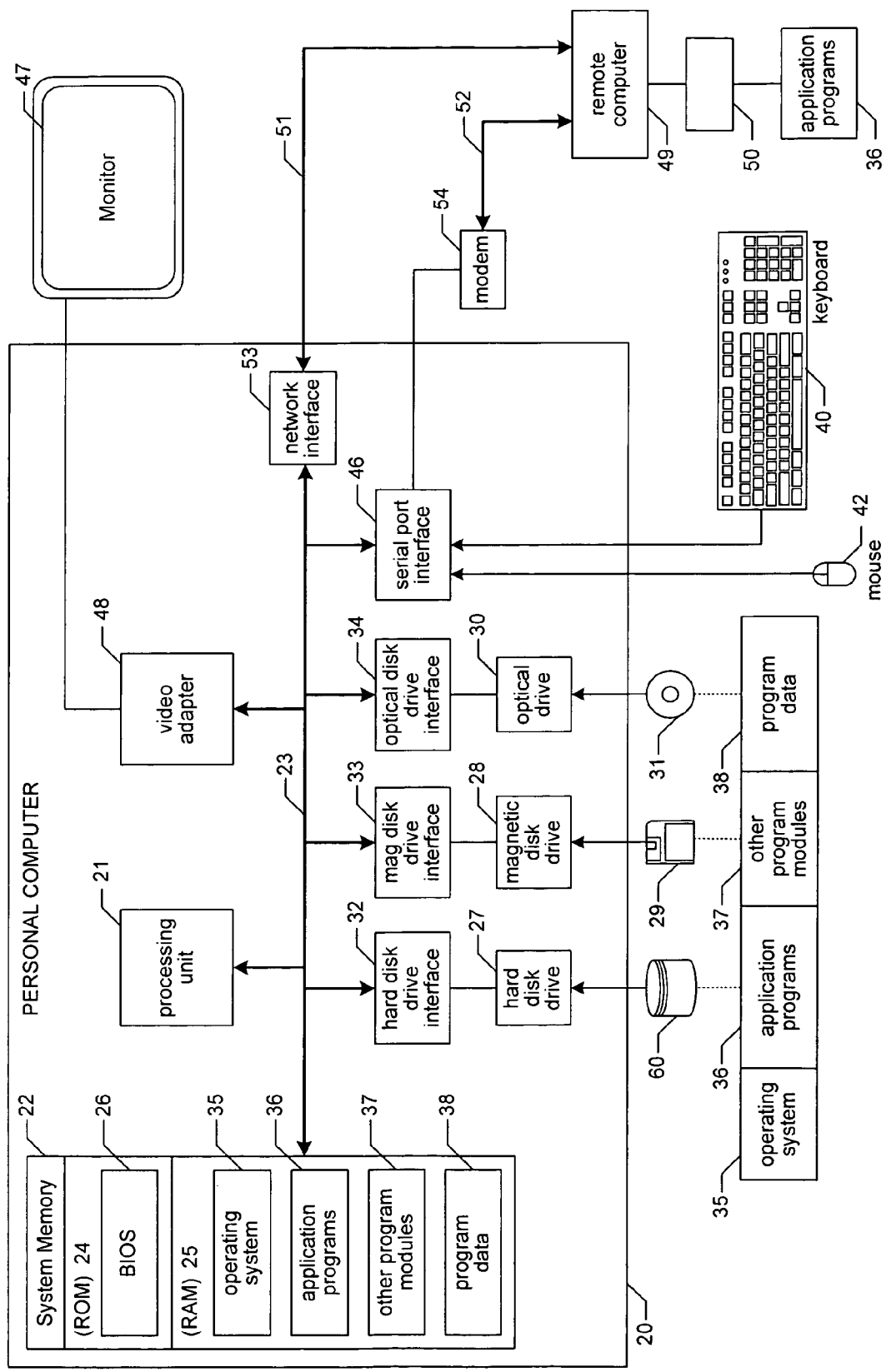
FIG. 1 is a simplified block diagram illustrating an exemplary operating environment suitable for application of the instant invention.

While the invention is susceptible of various modifications and alternative constructions, certain illustrative embodiments thereof have been shown in the drawings and will be described below in detail. It should be understood, however, that there is no intention to limit the invention to the specific forms disclosed, but on the contrary, the intention is to cover all modifications, alternative constructions and equivalents falling within the spirit and scope of the invention as defined by the appended claims.

DETAILED DESCRIPTION OF THE PREFERRED EMBODIMENT

FIG. 1 in the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, microprocessor systems, microprocessor-based or programmable computer electronics, network PCs, minicomputers, mainframe computers, and the like. The invention may also be practiced and distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purposed computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during startup, is stored in ROM 24. The personal computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of computer readable instructions, data structures, program modules and other date for the personal computer 20. Although the exemplary environment described herein employs a hard disk, a removable magnetic disk 29 and a removable optical disk 31, it should be appreciated by those skilled in the art that other types of computer readable media which can store data that is accessible by the computer, such as magnetic cassettes, flash memory cards, digital video disks, Bernoulli cartridges, random access memories (RAMs), read-only memories (ROMs), and the like, may also be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system busy 23 via an interface, such as a video adapter 48. In addition to the monitor, personal computers typical include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device, or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets, and the Internet.

When used in a LAN working environment, the personal computer 20 is connected to the local network 51 through a network interface or adapter 53. When used in a WAN networking environment, the personal computer 20 typically includes a modem 54 or other means for establishing communications over the wide-area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing the communications link between the computers may be used, e.g. dial-up modems/xDSL/cable modems, etc.

Having now described both the problems existing in the art and a suitable environment into which the solution provided by the instant invention is preferably applied, the focus is now turned to a description of a preferred embodiment of the instant invention. As indicated above, one of the first problems identified by users of NetMeeting™ 2.0 was the scalability problems associated with the fixed limit of 32 conference members and the static allocation of system resources driven by the Win 9x platform. A preferred embodiment of the instant invention, therefore, removes the fixed limit of users (now number of members in a conference is limited only by the available memory of the host) and utilizes dynamic system resource allocation. As these problems were resolved as will be described below, an underlying problem of excessive network traffic as the number of conference members grew resulting from the prior T.128 protocol was revealed. Therefore, a preferred embodiment of the instant invention involves enhancements to the T.128 protocol to allow for the efficient scalability of the conferencing and collaboration tool. An embodiment of the instant invention incorporating the teachings below may be found in a new release of the assignee's tool, NetMeeting™ 3.0.

Before discussing the specifics of a preferred embodiment of the instant invention, a brief overview of the multimedia teleconferencing standards is appropriate to form a foundation for the following teachings. The ITU-T T.120, H.320, H.323, and H.324 standard comprise the core technologies for multimedia teleconferencing. The T.120 standards address Real Time Data Conferencing, the H.320 standards address ISDN Videoconferencing, the H.323 standard addresses Video (Audiovisual) communication on LANs, and the H.324 standard addresses video and audio communications over low bit rate connections such as POTS modem connections. H.323 is so widespread because TCP/IP is extremely common and available for LANs, WANs, dial-up, XDSL, and all sorts of Network devices/configurations. The teachings and content of these standards are herein incorporated in their entirety by reference thereto.

The T.120 family of standards cover the document conferencing and application sharing (sometimes called data conferencing) portion of a multimedia teleconference. The recommendations specify how to efficiently and reliably distribute files and graphical information in real-time during a multipoint multimedia meeting. The objective of the standards is to assure interoperability between terminals without either participant assuming prior knowledge of the other system; permit data sharing among participants in a multimedia teleconference, including white board image sharing, graphic display information and image exchange, application sharing; and specify infrastructure protocols for audiographic or audiovisual applications.

The T.120 series governs the audiographic portion of the H.320, H.323, and H.324 series and operates either within these or by itself. The T.120 suite consists of a series of recommendations, which are summarized as follows:

| Recommendation | Description |
| --- | --- |
| T.120 | Data protocols for multimedia conferencing: This provides an overview of the T.120 series. |
| T.121 | Generic Application Template: This provides a guide for development of T.120 application protocols. |
| T.122 | Multipoint Communication Service (MCS) Service Description: This describes the multi-point services available to developers. |
| T.123 | Protocol Stacks for audiographic and audiovisual teleconference applications: This specifies transport protocols for a range of networks. |
| T.124 | Generic Conference Control (GCC): This defines the application protocol supporting reservations and basic conference control services for multipoint teleconferences. |
| T.125 | Multipoint Communication Service (MCS) Protocol specification: This specifies the data transmission protocol for multipoint services. |
| T.126 | Multipoint still image and annotation protocol: This defines collaborative data sharing, including white board and image sharing, graphic display information, and image exchange in a multipoint conference. |
| T.127 | Multipoint Binary File Transfer Protocol: This defines a method for applications to transmit files in a multipoint conference. |
| T.128 | Multipoint application sharing protocol: This defines how participants in a T.120 conference can share local applications such that other conference participants can see the image of the shared application, and use the mouse and keyboard to take control of the shared application as if it were running locally. |
| T.134 | Text chat application entity: A T.121 APE definition for a text chat protocol. |
| T.135 | User-to-reservation system transactions within a T.120 conference: This defines conferencing reservation protocols in a T.120 environment, typically between a client application and a scheduling systems which reserves resources for multipoint control units (MCUs or "bridges"). |
| T.136 | How Remote Device Control and configuration may be performed using T.120 as the transport protocol. |
| T.140 | Protocol for multimedia application text conversation. The protocol for text chat within T.120, goes with T.134. |
| T.VMR | Virtual Meeting Room control. Contains some material from previous T.13x drafts, concentrates on audio + dataconferencing. |

Of the above governing standards, a preferred embodiment of the instant invention provides enhancements specifically to the T.128 Multipoint Application Sharing Protocol to substantially improve scalability. As will be described more fully below, scalability is improved by eliminating a fixed limit on the number of users, by reducing the amount of additional memory needed to hold information for a new member/collaborator/sharer in a conference, by reducing the amount of additional total network traffic amongst the members of a conference required to complete the join/collaboration/share during a conference, and by reducing the computational complexity of the algorithms used, which is proportional to the amount of time required for anything to happen during a conference.

These enhancements are embodied in a new T.128 model. Unlike the global, chaotic model of NetMeeting™ 2.0, the T.128 model of the instant invention is a per-host model. In this model, each person hosting (sharing an application) acts like a miniature server for the conference. Network traffic almost always originates from hosts only, and wends its way down to the others viewing in the conference. Members have separate state information for each person who is sharing. The updates (shared application lists, the graphics of the shared applications, the current cursor position and shape) stream down from the host. To interpret packets coming from the host only requires the viewer to know the capabilities of the host. The network traffic from a viewer is not broadcast, but sent privately back to the host, when controlling. The rest of the members in the conference see the results (changes in appearance, movement of the cursor, etc.) which are broadcast by the host later. Since input, mouse and keyboard messages, are only sent privately from a controller to a host, the latency and responsiveness, especially of the mouse, is much improved. This is especially noticeable in large conferences since there is no performance penalty as more people participate.

Specific changes in the T.128 protocol contemplated herein which allow the realization of the advantages of the instant invention involve not sending ignored user name/capabilities in some control packets; removing/ignoring many capabilities; streamlining cache capabilities negotiation when a node starts to share, stops sharing, and when a new person joins the conference; creating caches; order encoding data each time a note starts to host, and freeing/cleanup when the node stops hosting; eliminating some packet broadcasts to everyone in the conference or replacing them with targeted sends to an individual; and a new control model and new control packets. Like file transfer (T.127), T.128 has distinct send side (hosting) and receive side (viewing) parts that compose the logical T.128 applet. In the instant invention, a node in a conference is a host when it is sharing applications or its desktop. The act of hosting or sharing is the process of trapping the graphics on the screen and transmitting the updates for the entities that are shared. There is an UI applet for hosting which basically is a dialog that lists all of the top level applications running along with the entire desktop. This UI shows what is shared, and allows a user to share/unshare items and to stop sharing everything. This applet also allows a user to change whether the shared applications/desktop are controllable, and has other options for 24-bit color sharing and automatic handling of control requests. A node in a conference is a viewer when a remote node is hosting and it has AS active (unless application sharing is prevented by system policy). The UI for viewing may be a frame window displaying the shared contents of the remote host.

A host in a conference is controllable when it has checked Allow Control in the Conf Tools menu (or if SDK code does it pragmatically). At this point, it is possible for remote viewers to take control of it. When a viewer takes control of a controllable host, it becomes the controller of the host. When a viewer of a host becomes its controller, the host's own keyboard and mouse are locked, and input comes from the controller instead. The act of controlling is the process of sending input and window activation back to the host to drive its shared entities.

When at least one node in a conference is a host, the nodes in the conference are in a share. A share is another name for an active T.128 session. T.128 is the least T.120-ized of the standard applet protocols, since it came from a non-T.120 two person only primitive world (R.11). As such, there is some redundancy. Some of the rich T.120 primitives, like getting into conferences, exchanging capabilities, and determining the roster, are found in a more primitive form in T.128. So a share gets created, joined, and ended just like a conference does. And members are added and deleted just like in a conference.

In an exemplary embodiment of the instant invention, there are four parts to the T.128 protocol: CMG, the T.120 wiring to find out about calls and activate AS sessions; S20, the share establishment/capabilities exchange/member join/leave/share termination part; CPC, the member capabilities data sent via S20 control packets; and DATA, the AS streaming part, for hosting and controlling, which accounts for the capabilities of the share members so it does not send data or packets that they cannot understand. The following description of an exemplary embodiment is included by way of example, and not by way of limitation, to enable one of ordinary skill in the art to practice an embodiment of the instant invention.

CMG is utilized to find out when calls start, when calls end, and when members are added/removed. When a new call is starting, AS receives a permit to enroll indication notification. It enrolls its application by filling in a GCC session key field with appropriate key types, capability structure, etc. as is standard. The enroll request is filled in and the application enroll method is called to enroll or unenroll in the conference starting/ending. When an enroll confirm notification is received, it looks for success or failure. If failure, it cleans up as though the call had ended. If success, it enrolls the new member and watches for the application roster report indication notifications that indicate change. Finally, CMG looks for the local node in the member list, the first time it is seen the member is considered finally to be in a T.120 call. It processes its own section, looking for new members so it can add them, and for old members now gone so it can remove them. These are GROUPWARE members only, application sharing (AS) member addition/removal comes independently through the S20 protocol. When AS finally believes itself to be in a T.120 call, it attaches to the MCS domain so it can send and receive data. When the domain attachment is confirmed, AS joins two MCS channels: its own MCS user channel; and the MCS AS broadcast channel. When both of the MCS channels are joined, the system is ready.

S20 begins where CMG leaves off. In this exemplary embodiment there are six control packets, then one for data which is used by the streaming part of sharing. All S20 packets have a header. The exemplary packet types are as follows:

| | |
|---|---|
| S20_CREATE | Control packet to create a new share |
| S20_JOIN | Control packet to join an existing share |
| S20_RESPOND | Control packet to respond to and S20_JOIN |
| S20_DELETE | Control packet to eject a member from the share |
| S20_LEAVE | Control packet to yourself leave an existing share |
| S20_END | Control packet to end an existing share |
| S20_DATA | Data packet, the S20 part is a header |

When the MCS channels are joined after a new call starts, AS broadcasts an S20_JOIN packet on the T.128 channel to join an existing share. If there is an existing share, the system will see a response on the T.128 channel, an S20_RESPOND packet with the MCS user ID as the node being responded to, from the node that created the share. Others in the share will see the S20_RESPOND also. Each will add the new member into their member lists, and if successful, each will broadcast another S20_RESPOND out on the T.128 channel. This will be ignored by the existing people in the share, since they already know about these other existing members. The remote people are added one by one this way into the new member's member list. Preferably, these messages acknowledging the new person and informing him about the existing members are only sent privately to the new member to reduce network traffic. The capabilities and user name are a couple hundred bytes of data and are included in these packets. When leaving an existing share, a node broadcasts an S20_LEAVE packet on the T.128 channel. The other members of the share will see this message and remove the member leaving from their member lists. When something goes wrong letting a new node join into a share, e.g. if a share is taking place with members utilizing NetMeeting™ 3.0 embodying the teachings of the instant invention and a member utilizing the old NetMeeting™ 2.x tries to join, the share creator broadcasts an S20_DELETE packet on the T.128 channel with the MCS user ID of the node being ejected. The share ends when the share creator leaves the share. The share creator will broadcast an S20 END packet on the T.128 channel, and the other members will clean up and terminate also.

If no share exists when a user tries to share an application, that node creates a share first, then continues with sharing the application. The node broadcasts and S20_CREATE packet on the T.128 channel. There are ways of arbitrating conflict, e.g. if two participants both try to create a share around the same time. In general, in prior systems the share is not created until at least one remote node sends back an S20_RESPOND packet acknowledging the S20_CREATE request. This is why application sharing in NetMeeting™ 2.x could only activate when at least two nodes were in a conference and application sharing capable. In the system of the instant invention, however, if the node trying to create the share is also the T.120 top provider, the code assumes success instantly since the collision arbitration algorithm will always resolve in favor of closeness to the top provider. In this way, the system of the instant invention will allow the creation of a single party share, allowing one to host a meeting, share application(s) or desktop, and have it persist. The share will create instantly, and it will not terminate when no one else except the host is left in the conference. Additionally, this method is faster for the end user who wants to share applications or desktops since it completes almost immediately.

For CPC, the member name and the member application sharing capabilities are exchanged via the S20 control packets. When a new member is added into a share list, the share capabilities are recalculated. Most of these capabilities are used to determine what kind of application sharing data to send when hosting. Prior systems used to do a lot of recalculation whether it was hosting or not. The system of the instant invention, however, only does recalculation when it is hosting, since starting to host will calculate the capabilities based off the people in the share at the time anyway. Moreover, a lot of recalculation is gone completely making it a lot faster and easier to handle a new member of the share. The total capabilities block is basically a list of the area capabilities (PROTCAPS) blocks with IDs for each. Members ignore PROTCAPS blocks with unrecognized IDs.

In prior systems when a node started to host, it would calculate the outgoing cache sizes based on the capabilities of everybody in the share. It would take the minimum of its size and those of all the other people in the share. In the case where there are sender and receiver capabilities, it would take the minimum of its send capabilities and everybody else's receiver capabilities. When the other nodes found out that somebody was hosting, they would have to calculate what size to create the incoming caches. They would then take the minimum of the host's and everybody else's capabilities. Then, when somebody new joined the share, everybody would have to recalculate the new cache sizes again. In essence, everyone in the share had to know about each other to be able to interpret and handle the packets coming from a host. Besides being expensive to recalculate all the time, it would be impossible to ever implement lurking/passive/multicast-like application sharing. This prior system could never have implemented a streaming application session, like NetShow™ presentations or multicasted video because of the impracticability of having 10,000 people find out about each other and do calculations based off each other's capabilities.

In the system of the instant invention, when a node starts to host, it creates outgoing caches with exactly the sizes it wants, which it has specified in its capabilities already as described above. When the others find out that somebody has started hosting, they create incoming caches of the sizes specified in the host's capabilities. Further, when someone new joins the share, the existing members do not have to do a thing. The new member will find out that someone is hosting, and will in turn create incoming caches from the capability sizes. In this system of the instant invention, a viewer only has to know about the host's capabilities. The viewer creates caches based off only the sizes given in the host's capabilities. After this the process is done, no recalculation is necessary. Moreover, the outgoing caches for bitmaps/cursors/palettes/savebits/order encoding are created on a node when it starts to host and freed when it stops. The corollary incoming caches for bitmaps/cursors/palettes/savebits/order encoding are created for a remote node on viewers when they find out the node has started to host, and freed when they find out the node has stopped hosting. Prior systems used to keep the caches around for a person as long as the share existed and the person was in the share. These would be reused, in the state they were left in, if the person started hosting again. This was typically megabytes of memory to keep around. However, since new members of the share would not have the saved cache state, the contents of these caches would be wiped out anyway.

The data packets transmitted, as indicated above, are prefixed with the S20DATAPACKET structures, then a DATAPACKETHEADER. These are the stream types (dictionaries). All of the packet types are grouped into one of the few streams, the groups have much in common as far as contents and sizes, so they compress together well. The types of data packets include drawing/graphics updates sent by the host and the supported font list, which is sent by everyone in the conference to each other. While this is really a capability, it is so large (could be 32K) it is not exchanged via the S20 protocol. The data packets also include control packets, active window notification sent by the host, or activate/restore requests sent to the host, the shared window list sent by the host, the hosting state (hosting applications, hosting desktop, hosting nothing anymore) sent by the host, cursor appearance/position notification sent by the host, keyboard/mouse input sent from controller to the host, and a sync packet from existing member of a share to a new member to let the new member know that the group is aware of him and how to handle data from the group. This is needed because of cache states, order encoding data, and font lists. Further data packet include the changed capability, e.g. when desktop size/color depth changes. The compression types on the packet data include: not compressed; PKZIP compressed, but atomic, no info about previous packets is need to decompress; and persistent-PKZIP compressed, information about previous packets sent on same stream is needed to decompress.

As compared with the prior versions of NetMeeting™, the system of the instant invention provides fewer and smaller Shared-Window-List (SWL) broadcast packets. These packets provide notification of the list of shard window states, positions, sizes, along with areas that are obscured, if anything has changed since last time. In the prior systems, the SWL packets were sent by people hosting, and by non-hosts if they were in control so that everyone else would sync to the placement of shadows on their system. Shadow windows, representing shared information from other people, were always included in the list as well. When joining and leaving, an empty packet was always sent, even if the member was not hosting. There were lots of packets dropped due to collisions in z-order when multiple people were hosting, or packets applied and then another z-order packet would be sent out in a Ping-Pong effect. Now, only the host sends the SWL packets, the contents of which are simply windows shared on the host, and things that obscure parts of the shared windows. Therefore, when not hosting and joining/leaving share, no packets are sent. Further, z-order is not changing all the time because a plurality of shadows are not changing independently as before.

In addition to the fewer SWL packets, the system of the instant invention also provides fewer Active-Window-Coordinator (AWC) broadcast packets. These packets provide notification of the currently active shared window (or NULL if none), if this window has changed. These packets also provide requests to activate/minimize/change state of a shared window. In the prior systems, the current active window was sent out periodically, even when not hosting. When hosting there were many different states, and applying notifications/requests from remotes would often cause another packet to be sent in a Ping-Pong effect. Additionally, there were requests to simulate tray behavior (right clicking on tray button for shadow of shared window would cause system menu to popup on host if in control), to close and minimize windows. In the system of the instant invention, notifications are only sent by hosts about currently active window. There is no need to distinguish different types of "no shared window" active cases, meaning fewer broadcasts. Only shared window or nothing is sent. Requests are only sent from the controller to the host to activate/unminimize shared window, or to inject Ctrl+Alt+Del in case of NT Remote Desktop Sharing (RDS). RDS is a service process that uses application sharing to share the entire desktop of a machine back to whomever called in. Ctrl+Alt+Del simulation is needed on NT because that is the way a user logs in, shuts down, or locks the workstation.

The system of the instant invention also provides fewer cursor broadcast packets, which provide current cursor image and position if either has changed. In the prior systems, the current cursor position was sent out periodically by everyone, as was the current cursor image. Depending on the control state, a node may have sent out a cursor broadcast or an input broadcast. With the system of the instant invention, only the host sends the cursor shape and position. If a host is controlled and its cursor position is out from the last know controller mouse position, a sync bit is added to the cursor position broadcast. The controller will, upon seeing this set, move his mouse to the cursor position given by the host.

The system of the instant invention also provides fewer Hosted-Entity-Tracker (HET) broadcast packets, which provide notification of current hosting application/desktop value. Before, when sharing applications the current top level shared window count was sent out. Every time a window came or went, another new count was broadcast. However, remote viewers only cared when the count transitioned to or from zero. Therefore, the system of the instant invention only sends changes from zero to non-zero (hosting applications/desktop), and from non-zero to zero (stopped hosting). The intermediate counts are useless and were ignored by the remotes, so they are no longer sent.

The system of the instant invention also provides a significant reduction in the number of Synchronizing New Individuals (SNI) broadcast packets. These packets indicate a member joining, and are sent on each stream by each existing person when a new person joins into the T.128 share. They tell the new person that the sender knows he is present, that any data from that point on takes the new person's capabilities into account, and that the new person can now process packets from the sender. These must be sent and handled before anything can continue in the share. In prior systems, when a new person joined a share, everybody in the share would loop through everybody else in the share, and for each person broadcast a sync packet per stream. These broadcasts would happen for each stream, and there were five streams, although two of those were not really used. This meant that the prior system was synching streams that data was never sent on. Now, however, the people in the share only broadcast one packet apiece per stream a packet for the new member joining. The new member joining then broadcasts a packet for each person already in the share. In other words, application sharing nodes need to send a sync packet to people who are new to them in the share. Further, the number of streams of concern have been reduced from five to three. A sync is sent only on a stream when data is needed to be sent on it, which reduces the number still further to one for people who are just viewing.

The system of the instant invention also provides fewer Control Arbitration (CA) packets, which provide notification of the current collaboration state (detached, collaborating, controlled, in control), and which provide requests to control, grants of control handled by the node currently in control. In prior systems control was global whereby all nodes collaborating are controlled by mouse and keyboard of the node in control. Nodes could be controlled (locked) even if they were not hosting. They would play back the mouse/keyboard input, only to discard it at the last second since it should only be played back to shared applications. Every state change was broadcast, and all nodes, whether hosting or not, needed to broadcast state changes. If a packet could not be broadcast (low memory or simply too much traffic), state change would not occur. This would result in a controlled node remaining frozen, unable to use his mouse or keyboard, for a long time until it could get a packet out. Now, the control state is broadcast from hosts only when allowing control state changes or when start/stop controlling. Control operations (taking control, releasing control, bouncing control, etc.) are private between host and another node and are not broadcasted.

The system of the instant invention does provide additional new control (CA30) packets, which provide request exchanges to take control, release control, bounce control, invite control, pass control, etc. The new control model is similar to the calling model whereby a node asks to take control of a host like placing a call to a remote. The node gets back a response (no with reason or yes). Until this response, the node can time-out or cancel the request on the viewer side. The host can allow the end user to accept or reject the incoming take control request. Either side can hang up, the controller can cancel or release control and the host can bounce control. this works locally even if packets cannot get out. Even if the system runs out of memory completely, the local node will not be stuck in a state it does not want to be in. Further, hosts can invite viewers to control them, like inviting a remote to join a conference.

In addition to the above, the system of the instant invention also provides fewer Input Manager (IM) packets. In prior systems, the person in control if collaborating, or any detached host, broadcasted input packets every mouse move/click/keypress. Everyone not collaborating treated these like notifications, and updates the keyboard state table/mouse position of the sender (and all controlled nodes if from person in control). Everyone collaborating treated these like requests and injected the input into their machine. This would be horribly slow in a large conference if a controller moved the mouse a lot. NetMeeting™ 2.x collapsed the mouse packets which resulted in jerky and unresponsive cursor movement. In the system of the instant invention, input packets are sent privately from a controller to a host, not broadcasted. The controlled host then periodically broadcasts the new cursor position/shape due to the input played back from the controller. This allows multiple hosts to be simultaneously controlled by multiple independent users. The result in very high mouse fidelity and lower bandwidth in a large conference.

The result of these changes is a substantial reduction in network traffic from existing NetMeeting™ 3.0 nodes when a new person joins a share, especially from these node that are not currently sharing. Each node was sending a lot of packets that were ignored on the remotes or did not benefit anything. Now, when a host starts sharing the process is greatly simplified. With 50 people in a conference, e.g., the traffic to get everyone in sync shrunk from 12,851 broadcasted packets to only 265 broadcasted packets.

As an example illustrating this simplification, assume that six people are in a conference, having already exchanged capabilities and fonts, and a host starts sharing his desktop. The host broadcasts an application sharing S20_CREATE packet (which includes his name and AS capabilities). In response, five other users respond by broadcasting an S20_JOIN packet with their name and AS capabilities. For each person who joins the share, the host will perform a sanity check of the viewer's capabilities, and if there is a problem, will broadcast an S20_DELETE packet for that viewer. Assuming all is well, the host creates a person structure with the minimum amount of system resources necessary to view. The host then resets its caches (palette, graphics), and broadcasts a sync packet. The host then entirely repaints that which is shared. After this, the host retransmits its state (HET) indicating what he is sharing (desktop, application, not). After this the host sends its font packet, and waits for the viewer's font packet.

On the viewer's side, once the S20_CREATE packet is received, a sanity check is performed on the capabilities. If all is well, the viewer replies with an S20_JOIN broadcast. At this point, the viewer and host are in a share. The caches are reset, a sync packet is sent to the creator, and the font list is sent. The viewer then receives the sync from the host, the font packet, and the desktop or application HET. The viewer then creates cursor cache, a palette cache, and a bitmap cache all of size the host said. The viewer then creates the compression saved history and the order decoding structures and memory. Finally, the viewer creates a bitmap for that person's desktop, or window to view what's shared. When the viewer wants to stop viewing, he sends a HET packet indicating that nothing is shared. The viewer then destroys the window, and frees the blocks shared. However, the viewer stays in the list.

During application sharing, it is instructive to note what is needed for a viewer to represent what is on the host's screen, utilizing desktop sharing as an example. First, the viewer needs to be able to recreate the graphics on the host's screen. This includes the cursor (logical position, image, current location, etc.), as well as the palette (were true color cannot be supported as described below). This was needed to allow translation of palette code to actual color in 256 color applications. The alternative would be to take a bitmap of the desktop. However, since this could be approximately one megabyte of data, the transmission of palette codes saves greatly. The viewer would also need to recreate the text (font, language information local information, character set information, multi-national information, Unicode, etc.). If a viewer does not have the font, the host does not send text drawings to the people in the conference at all. If text is put up by a shared application using a font that is not available on all remote viewers, a bitmap of that part of the screen is sent instead. While this is a lot bigger than a simple text drawing description, it is safe and can be handled by everyone in the conference. This is what application does in general when there is no commonality, it falls back to screen data. The viewer also needs the bitmap cache (toolbar images, etc.) and the order encoding cache. The host sends only change of drawing unit of the type. The header for each drawing unit indicates the field types that are being sent. If these are not there, then they are the same as the previous one. When someone joins a share, the host invalidates the entire screen and forces a refresh (repaint from scratch). Then the caches are rebuilt.

For application sharing, the host needs to represent the window to the viewer, with a list of what is shared, the z-order, the shape and position of each window, and what is currently active. When the host is being controlled by a remote, he uses a control timer mechanism to ensure that other viewers' screens are kept up to date. Therefore, the playback of input first processes fast input such as the mouse clicks, cursor position and shape. Next, the window list for application sharing indicating what and where things are is processed. Finally, the graphics are processed, including the list of orders and screen data. If, for any reason, the window list or graphics cannot be sent, they are skipped so that the fast input may again be processed.

As indicated above, the new collaboration model of the instant invention, preferably implemented in NetMeeting™ 3.0 application sharing, is per-host. By collaboration it is meant the process of allowing, inviting, granting, and revoking control to others of shared applications. This new model is developed to go along with per-host application sharing described above. In the previous versions of the application sharing protocol, T.128, collaboration was global as described above. Each member of the conference could start/stop collaborating. Exactly one of the members collaborating was considered to be in control. Her mouse/keyboard drove the mice/keyboards of the other members collaborating. Those other members were controlled, and their keyboards/mice were locked. However, if they weren't sharing anything, the mouse and keyboard input from the person in control would go to nowhere, since we only let the remotes control shared applications and not unshared ones. So their keyboards/mice were locked for no reason, which was very frustrating especially in the multitasking world of Windows.

Anybody collaborating could become the person in control by a simple action (a mouse click or key press). If several people took control around the same time, the last person to do so won, until the next person took control. There was no organization or order, it was a chaotic model, our users called it "mouse wars". With a decent number of people in a conference, the telephone was the only way to keep things from getting out of hand. There was a lot of "OK, I'm going to take control now, don't do anything anybody" discussion back and forth.

Collaboration was a two-way street. A person might only want to control another's applications without exposing his own. But that wasn't possible in this old model, collaboration was all or nothing. And there was no way for a person to gracefully decline a control operation or even know that it was about to happen—control would be yanked away without warning. This application sharing control model (a.k.a. Collaboration) is unfriendly to shared app hosts, controllers, other meeting participants, and SDK clients. The model is a global free-for-all, with no reliable way of denying, canceling, or undoing dangerous operations via the user interface or driving code. These problems are parallel to those people used to have with shared app views. Each person in the conference had "shadow windows", representing a top level shared window from a host. People could not move them, size them, get them out of the way, or put them back in the way when desktops were of different sizes, or change the z-order.

In this old control model, "Collaboration", means a user's mouse and keyboard are synchronized with those of all other members in the conference who are collaborating. The person in control is in control of all the other people collaborating, and his input is played back on all of those other machines. In NetMeeting™ 2.x, a user could collaborate and be driven even if he were not sharing anything. This ended up being for no reason, since all of the played back input would eventually be discarded. Pressing the "Collaborate" button would do one of several somewhat unpredictable things depending on the state of the user and other people's states. It would either cause the user to start collaborating, to take control if already collaborating, or to stop collaborating.

In this prior system, as indicated above, collaboration is GLOBAL to the conference. Collaboration is a set of states, detached or cooperating, and then in control only if cooperating. When the state changes, several broadcasts from different people occur. The potential controller broadcasts "cooperating" to start collaborating if he isn't already, the potential controller broadcasts "request control" to take control, and the current controller broadcasts "granted control" to the potential controller. Of the members collaborating, one and only one person is in control. That person's mouse and keyboard drive the mice/keyboards of the other members collaborating. Each control change requires some retransmitting of input state information, especially toggle keys, and discarding old accumulated input. The person in control broadcasts his input messages to everybody. Then all the people collaborating play back these input messages, skipping ones that obviously would manipulate non-shared windows, and then if they ended up going to a window not shared, would swallow them at the last minute. That allows the cursor to move, but the actual movement of the mouse notification to not get sent to the windows under the mouse if they are not shared. Additionally, there was a lot of complicated token/sequence number/guessing/time stamp calculations done to figure out who has control if several people try to grab it at once, or it was taking too long to hear back. Further, taking control was a free-for-all as indicated above, anybody could take it away from the controller at any time. This often resulted with somebody in control even if there was nobody else to be controlled.

As may be apparent from the forgoing, the prior system had many areas of improvement available. Since collaboration was global, it only worked when the shared application pool was global, all in same relative place on everybody's screen. Further since collaboration was bi-directional, taking control of another's shared applications also left that user open to being controlled. Collaboration was also quite noisy, requiring several broadcasts from an individual when his state changed. To take control required three broadcasts: cooperating, request control from person taking control, granted control from person handing off control. This collaboration was also end-user chaotic, wherein everybody could take control, the last person to do so wins, which resulted in a big user interface free for-all. This collaboration was also SDK chaotic, wherein there was no way for SDK code to do conference management and get notified in real time or confirm/deny control changes. Additionally, the collaboration was not easily undoable, in that the hosts could not "bounce" the current controller while staying "controllable" for somebody else, and the controllers could not "let go" of a host without going back to the main NetMeeting™ 2.x UI and pressing the Collaborate button some random number of times. Collaboration was also not deniable, in that the hosts could not choose to accept/deny a request to take control. Nor was collaboration cancelable, potential controllers could not cancel a pending take control operation if it was taking a long time, e.g. in a large conference.

As indicated above, the new control/collaboration model of the instant invention is per-host, a nice parallel to the new T.128 protocol. Control, rather than being global, is per-host. Each the host can be controlled by one the remote, and several the hosts can be controlled in parallel by several distinct the remotes. A member can be a host and be able to control another without opening up his own shared applications to control. However, one can not be in control of a host and controlled by another the remote at the same time. Control can be initiated, canceled and refused on either side (the host and the controller). It can be handed off to a third party. There is graceful timing out and failure handling. Both the controller and the host can continue in low memory or stress situations. Although round-trip communication between a host and a the remote is required, either side can move on and do something else without waiting to hear from the other. The user interface is also unintrusive, dialogs are not modal and hang around for a while before timing out so end user can handle them as is convenient.

The person in control sends all his input messages, mouse and keyboard, along with other information needed for states, like IME keys and TOGGLE keys, to the person controlled, privately or per-host. The person controlled plays back this input, and attempts to prevent any from going to windows/applications that are not shared. That way a controller can not actually cause a click in a non-shared application. The person controlled's mouse will move in sync with the controller, it must for dragging and other operations, but the actual mouse moves are not passed to the applications.

The controller's system does spoiling and other massaging of the input to send. For example, to prevent applications from going into drag-drop mode, application sharing waits a bit after a mouse button down looking for a mouse button up. That way the down/up go in the same packet and are played back quickly, creating a click. If the down/up were split up, the time latency is such that many applications including the explorer itself would assume the mouse was going to be used for dragging something. A corresponding example would be key downs/ups, to avoid simulated repeats, or duplicate keys caused by Windows itself generating other key sequences in the default window handler. And since mouse moves can be discarded, if outgoing packets start to backup, they can be combined. This may somewhat increase jerkiness on the remotes, but this is better than getting stuck because so much outgoing traffic is generated that nothing else can get sent.

There is corresponding code on the controlled side to playback the input. Events at several levels have to be discarded, and there are some exceptions for discarding events with screensavers, other desktops, and system dialogs like the fault error message. The input must be played back with roughly the same time differences as it occurred on the controller. These cannot be input into to the OS all at once, since Windows™ will do different things based off the system keyboard state.

Basically, there is a pretty well-defined sequence of network traffic with control. The controller sends input events to the controlled person. The controlled person then broadcasts notifications to everybody in the conference of cursor position/shape changes and window position/appearance updates caused by playing back the input from the controller. Operation of this new control structure may be better understood from the following simple examples of how this new model works. Note that a host is a conference member sharing applications/desktop.

To indicate controllability, the host broadcasts a control state packet, with control allowed or not allowed. The remotes can use that as indication about whether to permit users to try to take control of the host via UI. To take control of a host from a the remote, the remote user selects UI like menu command (or code makes function call). The remote sends a take control request to the host. The remote waits to hear back yes/no from The host. At this point, the remote can either cancel the take control request or do some other control operation which will also cancel this one. The host displays a take control request UI to the end user (or not if unattended or passes to code to handle). The user can say yes/no. This UI is not modal, it can sit until the end user is ready, although it may time out and act like user said no. The host sends a take control reply to the remote with the yes/no result. The second this happens, if yes, the host is controlled by the remote.

To grant control of a host to a the remote, the host user selects UI (or code makes function call). The host sends an invite control request to the remote. The host waits to hear back from the remote. At this point, the host can either cancel the invite control request or do some other control operation which will also cancel this one. The remote displays the invite control request UI to the end user (or not if unattended or passes to code to handle). This user can say either yes or no. This UI is not modal, it can sit until end user is ready, although it may time out and act like user said no. The remote sends a invite control reply to the host with yes/no result. The second this happens, if yes, the host is controlled by the remote.

If the host wants the controller bounced (hitting ESC key on the host is UI for this), the operation occurs immediately and then the host sends a bounce control inform message to the remote. If the controller wants to let go of the host, the operation occurs immediately and then the remote sends a release control inform message to the host.

If the host is controlled but the user needs to handle something temporarily, like a call dialog or a popup from some other application, the host sends a pause control inform message to the remote. The remote stays in control but can tell the user that the mouse/keyboard will not do anything until unpaused. When the user is done, the host sends an unpause control inform message to the remote, and they pick up where they left off.

To pass control of a host, the remote sends a pass control request to the host. At this point the remote is no longer in control, i.e. the remote can not undo or take back the pass control request. This is different than requesting or inviting control. The reason for this is to avoid long stacked-up sequences of people in the conference waiting for each other to take their respective actions. With control, it was decided to only allow dependencies between a host and a viewer, none between different viewers. This avoids deadlocks and jams for long periods of time. The host displays a pass control request UI to end user, who can say yes/no. If the host user says no, the host sends a pass control reply with failure immediately to the second remote. If the host user says yes, the host forwards a pass control request to the second remote. The host waits to hear back from the second remote. At this point, the host can either cancel the pass control request or do some other control operation which will also cancel this one. The second remote displays the pass control request UI to the end user, who can say yes/no. The second remote sends the pass control reply to the host with the yes/no result. The second this happens, if yes, the host is controlled by the second remote. Otherwise, the host remains in control.

As may be apparent from the foregoing, control is made per-host, with cancelable control request, via controller UI and controller SDK code (auto and confirm mode), confirm/deny control request, via host UI and the host SDK code (auto and confirm mode), and undo-ability of control by both controller and controlled the host, via UI and SDK code. With this, the moderation/control/floor model can be managed on a per-host basis.

Therefore, the system of the instant invention provides collaboration/control which is per-host in the conference. There is no collaboration anymore; there is "controlled" (the host) and "controlling" (the viewer). The hosts can turn on/off allowing control. Only the hosts which have allowed control can be controlled. Somebody not sharing is not a host, and therefore can not allow control nor be controlled. Taking control of a host does not open oneself up to being controlled (control is now unidirectional). Control is a privately negotiated contract between the host and the viewer, which once negotiated, cannot be randomly interrupted by a third member of the conference. Further, the hosts can grab control back from a controller without asking, and a controller can release control of a host without asking. Any third party who wants to control a host can not succeed until either the host or the controller breaks the control bond.

State changes (allow control state and being controlled by x) are broadcast from the host sometime after changes actually happen. If a viewer is controlling a host, he can not be taken control of, and if a host is controlled, he can not take control of somebody else. Further, a viewer can not control more than one host at a time, and a host can not have more than one controller at a time. To take control of a host, a potential controller sends the host a private request with an unique ID (unique to controller) identifying the request. The controller then goes into a "waiting to hear back" state during which the controller can release control, since "release" will follow the "take" request. Once the request is received, the host responds privately to the controller with "accepted" or "rejected". If accepted, the host then broadcasts state change some time later after receiving this information from the controller. During this state, the controller or the host can break the control bond at any time. If the controller breaks this bond, he sends the host privately a "released" notification, whereas if the host breaks it, he sends the controller privately a "bounced" notification. In all cases the request ID is remembered and used to identify the "control bond". This allows multiple/queued requests to be generated and responded to, ensuring the proper state on both sides when done. The hosts/controllers ignore out-of-date requests.

During the controlled period of a host, broadcast notifications involving the controller are ignored by the controller, since this controller always has more up-to-date information about his own state. If a host stops the hosting, then control state is automatically cleaned up. Likewise, if a host leaves a conference, then the host stops the hosting, and control state is automatically cleaned up. Otherwise, a controller can rely on always getting a response from the host before continuing. The controller should not send input to the host until an "accept" response has come back because the input packets do not have request IDs in them, and the host can not tell if they are out of date or not.

Everyone must handle UINT wrap-around. Allocating/sending packets can fail. For notification broadcasts, the host periodically checks if the current state (allow control/controller/requestID) is different than the last one sent. If so, the host simply tries to send new packet. For private controller/controllee communication, it's more complicated. Unlike notification broadcasts, these can not be "spoiled". They must be queued if they can not be allocated/sent. As such, controller/host states do not change until these queued packets are sent. The one exception is "waiting for control", which happens as soon as possible as a take control request occurs, flushed or not.

If the user turns off allowing control, queued request responses are all turned into "denied-control not allowed" responses. Also, request responses following a queued "accept" must all be "denied" responses. If the user turns off allowing control, current controller is bounced as well. If the user tries to take control of a second host when a take control request is still queued, the first one is superseded. In other words, only one take control request will ever be queued. The user can release control of a host with a take control request queued. If that happens, the release simply cancels the queued take. If the user tries to take control of a host when an earlier take control request has been sent but has not yet been responded to, the first one is canceled by a "release" packet. In the meantime, the controller can do whatever it wants when waiting to hear back. A preferred embodiment of the instant invention includes a message box with a "cancel" button. Likewise, the host can do whatever it wants when it receives a "take control" request, provided it follows the rules. In a preferred embodiment, a message box with "person x would like to take control, ok/cancel" is displayed, and incoming requests are handled in order of receipt. Further, the system may, via SDK code, decide that the new controller is the one, bounce the current one, and allow the new user to take control. Further, as described above, it could remotely push control by asking a remote to take control of it.

Another advantage of the system of the instant invention is the dynamic allocation of system resources. Unlike the prior systems that allocated all of the memory which could ever be needed for each member of a conference, the system of the instant invention allocates system resources dynamically as the members require them, and then frees up those resources when they are no longer needed. Application sharing takes a lot of memory to trap the graphics on the screen, utilizing a big enough buffer to make that a useful amount so that the system can look backwards in the buffer to minimize the amount of data which is actually sent.

As an example, if a rectangle is painted over, it does not need to be sent since the user cannot see it anyway. Additionally, if a circle is painted blue and then painted green, the system only needs to send the green information since the painting blue is hidden from the viewer. In this way, the amount of memory needed to view may be substantially reduced from that which you need to share. By separating out what one needs to view from what one needs to share yourself, the memory allocation to viewing members may be minimized, until one of those viewers starts to share. At that point, his memory allocation will be increased to accommodate the sharing requirements. When that person stops sharing, the additional memory allocation is then freed for utilization by that user for other purposes.

Figure 2A:
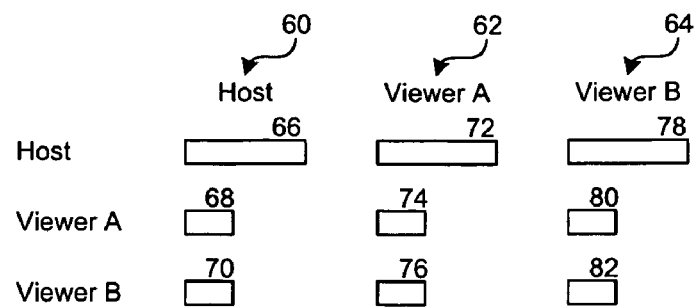
FIGS. 2a–c graphically illustrate in simplified bar chart form the dynamic memory allocation of an embodiment of the instant invention.
Figure 2B:
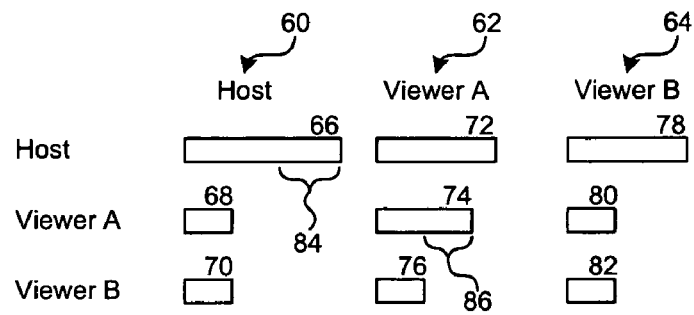
Figure 2C:
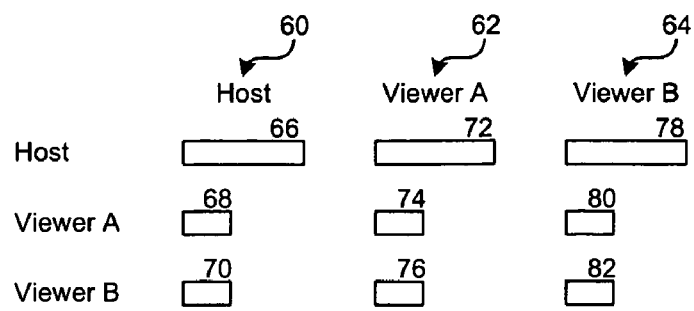

This dynamic memory allocation may be better understood with reference to FIGS. 2a–c. FIG. 2a illustrates in simplified bar chart form the memory allocations within the host 60, viewer A 62, and viewer B 64. As may be seen, within the host 60 memory has been allocated for itself 66, for viewer A 68, and for viewer B 70. Likewise, within viewer A 62 memory has been allocated for the host 72, itself 74, and viewer B 76; and within viewer B, memory for the host 78, viewer A 80, and itself 82.

If the host now passes control to Viewer A 62, dynamic memory allocation is accomplished as illustrated in FIG. 2b. As may be seen, upon passing control to Viewer A, the host 60 allocates additional memory 84 for itself to process the inputs from Viewer A who is now in control of the shared applications. Likewise, Viewer A 62 also dynamically allocates additional memory 86 for itself to allow it to control the host. Viewer B's memory allocations remain unchanged.

FIG. 2c illustrates the dynamic freeing of memory when control is passed back to the host 60 from viewer A 62. As may be seen, the memory allocations return to their pre-controlled states once control is passed back to the host 60.

Another problem with the prior systems lies with their requirement of at least two users existing in a conference before application sharing is allowed as described above. The system of the instant invention changes this operation by allowing a single user to initiate and conduct a share, with no other members of the conference being present. This is accomplished by not requiring the system to wait for a response. Instead, the system assumes that the sharing has succeeded, if the person sharing is also the host of the meeting. This operation is operates properly because any collision resolution (two people attempt to share the first thing about the same time) works in favor of the host always. With this embodiment of the instant invention, a host can share an application, or several applications, and unshare them too, when he is the only person in a call. Therefore, a host can share an application, share Notepad, and collaborate, e.g., then people can call the host, hang up, and call back as many times as they like, and the shared applications and collaborate state will persist. In prior systems, a person could host a meeting and share one thing. However, that one thing was not really shared, instead it was queued up to be shared when a second person joined the call. the share button stayed disabled until that happened.

This operation was due to the application sharing protocol. When creating a share, an S20_CREATE packet was broadcast to the application sharing channel. Until an S20_RESPOND or an S20_JOIN packet was received from some other party, the share was not considered to have been created. This operation is no longer required when the creator is the top provider. Instead, the system assumes that the second the T.120 objects are had all is well. The host does not have to wait for a response from someone else. As indicated above, this works well because if the top provider and someone else ever tried to create a share around the same time, the top provider always won. When a host has shared an application alone in a conference, there is still work being performed. All of the drawings are being accumulated, but they are not going anywhere. Additionally, no periodic calculation are happening. However, once someone else joins the share, the system proceeds as described above.

The system of the instant invention also provides true color 24 bpp support through the enhancements provided to the T.128 protocol by the instant invention. As indicated above, true color application sharing is a 24 bpp, non-palettized, standard interchangeable format that maps directly to the video hardware. The prior systems utilized 8 bpp data which is a palettized format. To accomplish this true color application sharing, capabilities were added, negotiation of color depth to support this new capability and handle people with it properly was fixed, and the bitmap caches were revised to handle the larger memory requirements of bitmaps three times the size of those at 8 bpp. Further, information was added to the drawing packets so the graphics of shared applications could be presented accurately.

True color data will only be sent if everyone has the capability to view it and everyone has a 24 bpp or greater display. The reason for this is that a display of less than 24 bpp will not accurately display 24 bpp information. Even 16 bpp (32,767 colors or 65,535 colors on NT) cannot display 24 bpp data properly because parts of the value get stripped, resulting in subtle green/blue/or red shifting, though not as extreme as today. The purpose of true color is to view accurately high color images. Therefore, is should not be utilized in circumstances where the fidelity of the results is questionable. Further, it generates a lot more data even if a member is not really sharing anything that requires it, hence the restrictions.

There is not much of a performance impact if a member is sharing an application such as Notepad™, since almost everything goes as orders which are the same size regardless of the bit depth at which it is sent. However, if a member is sharing a graphically intensive application, there may be quite an impact. This impact effects both the amount of data sent and the latency. This is because a fixed amount of memory is devoted to cached bitmaps. In true color, the bits are three times the size as 8 bpp. Therefore, only one third as many entries fit in the cache, meaning that we get fewer cache hits and must, therefore, send bitmap bits more often. Additionally, application sharing has a maximum uncompressed packet size of 32,000 bytes. That holds less packets for the same area painted. Further, there is less compression of true color screen data. The specialized algorithm to arrange the bitmap bits so they compress even better than just PKZIP only works for 4 bpp and 8 bpp data. PKZIP can only look back a fixed amount of bytes in the data, so sequences of the same color block do not shrink as well.

When supporting true color 24 bpp, the system does not distribute any palettes/color tables. When the color depth changes because someone leaves the conference, the system forces a repaint of the shared information. Prior systems did not do this even when switching between 4 bpp and 8 bpp, which resulted in some remotes seeing weird artifacts. Additionally, an unused field in orders packet is used to specify the sending color depth that they were generated for. Screen data has the color depth, so users know what to do with it, but orders did not. Under the prior system, users would not know whether to map a color to the closest palette entry or just use it plain. With the system of the instant invention, the drawing operations may be replayed properly. Further, the system of the instant invention will not compress any packet less than 256 bytes (prior system constant set at 128 bytes). Additionally, the system will persistently PKZIP packets less than or equal to 4k, which is the amount of persistent dictionary data saved. As it turns out, most packets larger than 256 bytes but smaller than 4k contain drawing orders.

In a further embodiment of the instant invention, the system dispenses with the exchange of capabilities and fonts. This allows true multicasting to take place (lurking). In this embodiment of the instant invention, the host simply transmits a periodic refresh, at which point he clears his cache and begins to rebuild them and forces a complete repaint of his screen. Since fonts are no longer exchanged, just images are sent to populate the cache and allow proper display on the viewer's screen (cache font glyphs). This elimination of capabilities and font exchange allows streaming of data to thousands of users which would otherwise be nearly impossible to complete.

Numerous modifications and alternative embodiments of the instant invention will be apparent to those skilled in the art in view of the foregoing description. Accordingly, this description is to be construed as illustrative only and is for the purpose of teaching those skilled in the art the best mode for carrying out the invention. Details of the structure and implementation of the various components described above can be varied substantially without departing from the spirit of the invention, and exclusive use of all modifications that come within the scope of the appended claims is reserved.

What is claimed is:

1. A method performed by a computing device for supporting true color graphics in a multipoint data conference having at least a conference server computing device and a conference participant computing device, comprising the steps of:
   examining by the conference server computing device color depth capabilities of all conference participant computing devices; and
   transmitting true color graphics if the examining indicates that all conference participant computing devices can support true color graphics.

2. The method of claim 1, further comprising the steps of:
   mapping true color graphics to closest equivalent in a color palette of a depth determined by the lowest color depth supported by any participant computing device;
   transmitting mapped graphics to all participant computing devices.

3. The method of claim 1, wherein true color is represented by at least twenty-four bits per pixel.

4. The method of claim 2, wherein the step of mapping comprises the step of mapping the true color graphics to a closest equivalent in a color palette that has fewer colors than true color.

5. The method of claim 1, further comprising the step of re-examining the color depth capabilities of conference participant computing devices upon addition and deletion of conference members.

6. The method of claim 5, further comprising the step of repainting shared information if the color depth capabilities change.

7. The method of claim 6, wherein the step of repainting shared information includes the step of transmitting true color graphics if all conference participant computing devices can support true color graphics.

8. The method of claim 6, wherein the step of repainting shared information includes the step of mapping true color graphics to closest equivalent in a color palette of a depth determined by the lowest color depth supported by any participant computing device.

9. The method of claim 8, wherein the step of mapping comprises the step of mapping the true color graphics to the closest equivalent in a color palette that has fewer colors than true color.

10. The method of claim 1, wherein the step of transmitting includes the step of specifying color depth in drawing order packets identifying the color depth for which these packets were generated.

11. The method of claim 1, wherein the step of transmitting includes the step of transmitting packets of less than 256 bytes in uncompressed format.

12. The method of claim 1, wherein the step of transmitting includes the step of persistently compressing packets to a size less than or equal to four kilobytes.

13. A method performed by a computing device for transmitting graphics in a multipoint data conference having at least a server computing device and a conference participant computing device, comprising the steps of:
   examining color depth capabilities of conference participant computing devices, the conference participant computing devices having differing color depth capabilities;
   identifying a minimum color depth supported by any conference participant computing device; and
   transmitting graphics at the minimum color depth supported by any conference participant computing device to all conference participant computing devices.

14. The method of claim 13, wherein the step of transmitting graphics comprises the step of transmitting true color graphics if all conference participant computing devices can support true color graphics.

15. The method of claim 13, further comprising the step of mapping true color graphics to a closest equivalent in a color palette of a depth determined by the lowest color depth supported by any participant computing device performed prior to the step of transmitting.

16. The method of claim 15, wherein the step of mapping comprises the step of mapping the true color graphics to a closest equivalent in a color palette that has fewer colors than true color.

17. The method of claim 15, wherein true color is represented by at least twenty-four bits per pixel.

18. The method of claim 13, wherein the step of transmitting includes the step of specifying color depth in drawing order packets identifying the color depth for which these packets were generated.

19. The method of claim 13, wherein the step of transmitting includes the step of transmitting packets of less than 256 bytes in uncompressed format.

20. The method of claim 13, wherein the step of transmitting includes the step of persistently compressing packets less than or equal to four kilobytes.

* * * * *